Figure 1:
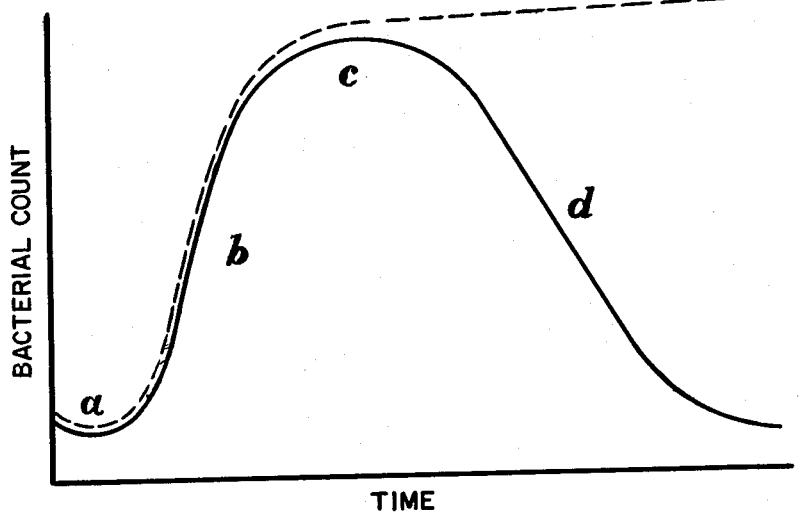

June 30, 1964 A. H. KILLINGER 3,139,382
BACTERINS AND PROCESS OF PRODUCING THE SAME
Filed Oct. 31, 1961 3 Sheets-Sheet 1

INVENTOR
ARDEN H. KILLINGER
BY Edmund H. O'Brien
ATTORNEY

INVENTOR
ARDEN H. KILLINGER

United States Patent Office 3,139,382
Patented June 30, 1964

3,139,382
BACTERINS AND PROCESS OF PRODUCING THE SAME
Arden H. Killinger, Fort Dodge, Iowa, assignor to American Home Products Corporation, New York, N.Y., a corporation of Delaware
Filed Oct. 31, 1961, Ser. No. 149,067
17 Claims. (Cl. 167—78)

This invention relates to improvements in the process for the manufacture of bacterins.

More particularly, this invention is concerned with growing bacterial cultures in specialized equipment under optimum conditions of nutrition and aeration, harvesting the bacterial culture during its logarithmic phase of growth, killing or chemically inactivating the bacterial cells, refining and concentrating the bacterial cells by centrifugation, and washing and resuspending the bacterial cells in a manner to provide standardized bacterial suspensions, of increased potency. These standardized bacterial suspensions may be used in preparing mixed bacterins. These mixed bacterins are intended for introduction into animals to stimulate increased resistance to single or mixed infections.

By a bacterian is usually meant a suspension of killed or chemically inactivated bacteria. This term is widely used in veterinary medicine, and applies to killed or chemically inactivated bacterial vaccines. A bacterin may be prepared from a single species of bacteria, or from a mixture of bacterial species.

The so-called "mixed bacterins" are widely used by veterinarians. While my invention is primarily concerned with mixed bacterins, it is not meant to exclude those bacterins containing only a single species of micro-organism. In veterinary practice bacterins are injected into animals in order to stimulate increased resistance to bacterial infections. The animal often responds to this stimulation by the production of antibodies against the specific bacteria which are evidence of increased resistance to future bacterial infection. The degree of response in an animal is often related to the quantity and quality of the bacterial cells in the bacterin. Results following the use of mixed bacterins have been variable, at times good, at other times not too successful. The variability in different lots of bacterin may explain some of the unsuccessful results. A number of these variables are overcome by the present invention.

Formerly, mixed bacterins were prepared by three general methods:

(1) Specific bacteria were grown in a medium comprising beef broth, peptone, and salt until the maximum turbidity was obtained. The bacterial cells were then killed or inactivated by heat or by the addition of chemicals. This constituted the bacterin. In practice individual bacterins might be pooled proportionally according to a formula into a "mixed bacterin."

(2) Specific bacteria were planted in suitable liquid media such as described in (1), allowed to grow for an arbitrary length of time or until maximum turbidity was reached, and then reseeded with another type of bacteria specifically utilizing unused ingredients in the medium. These mixed bacterial cells were then killed or chemically inactivated for use as a "mixed bacterin."

(3) Specific bacteria were planted on the surface of a suitable medium as described in (1) which had been solidified by the addition of agar. After being allowed to grow for an arbitrary length of time, the bacterial cells were washed from the surface of the agar medium and resuspended in a suitable diluent such as 0.85% NaCl. The resuspended bacterial cells were then killed or chemically inactivated. This allowed the production of "stock suspensions" of killed bacterial cells which could be further diluted and mixed in known proportions with other diluted stock suspensions to prepare a standardized mixed bacterin.

My invention may be further described in relation to the bacterial growth curves which are illustrated in FIGURES 1 through 5 inclusive. The meaning of these growth curves will be explained hereinafter.

When bacteria are introduced into culture media under suitable conditions, growth follows a definite pattern which may be plotted on a curve as shown in FIGURE 1. This growth curve is characterized by four phases:

(a) *The lag phase or "phase of adjustment."*—During this period, the bacteria grow very slowly and some cells may actually die.

(b) *The logarithmic phase of growth.*—Regular and maximum bacterial multiplication occurs. Favorable conditions in the culture media result in the organisms dividing at regular intervals, with a "generation time" characteristic to each species of bacteria.

(c) *The stationary phase.*—Growth rate of the bacteria is reduced during this period; their death rate matches the rate of new cell formation.

(d) *The phase of decline.*—The organisms die more rapidly than new ones develop.

Obviously, it is during the (b) period, when the bacteria are reproducing at the maximum generation rate, that they should be cultivated and harvested.

In the growth curve shown in FIG. 1, the viable bacterial count is represented by the solid line, the total bacterial count by the dotted line. It will be noted that these lines are practically identical during the logarithmic phase of growth represented by (b) on the curve. I have found that it is during the (b) period, when the bacteria are reproducing at the maximum generation rate, that they should be harvested for production in order to provide the highest quality bacterin. The present invention makes it possible to choose the precise optimum period for harvesting the bacterial cells.

After bacterial reproduction has occurred at the maximum generation rate for some time in the logarithmic phase, the rate of reproduction slows down and the maximum population density of bacteria is reached. This may be due to such factors as the exhaustion of nutrients or dissolved oxygen or to the accumulation of toxic products or acid. This is initially the stationary phase of growth and proceeds to the phase of decline. These phases are represented by (c) and (d) respectively on the viable bacterial count line of the growth curve (FIG. 1). Conditions existing within the culture during the stationary phase and phase of decline are not conducive to the production of bacterial cells of the highest antigenic quality for subsequent use in bacterin manufacture. These unfavorable conditions existed many times during the production of bacterial cells by the three general methods described above which were formerly used for the preparation of mixed bacterins.

The present invention describes a method for overcoming the disadvantages cited above. In this process specific bacteria are grown in a modified horizontal commercial fermentor such as that type of apparatus known by the name "Biogen," manufactured by the American Sterilizer Company. This apparatus is equipped with a variable speed helical agitator so that air or other gases can be mixed with the growing culture in a manner to provide optimum aeration for the respiratory activties of the bacterial cells. Optimal agitation also prevents the accumulation of harmful concentrations of toxic products near actively metabolizing bacterial cells. This apparatus is also equipped with a special sampling device. This allows taking a sample of the actively growing culture in order to check the phase of growth in order to determine the optimum time of harvest of the bacterial cells which is near the end of the logarithmic phase of growth. It is also possible to test this sample in order to determine what nutrients have been depleted and to determine what adjustments in the pH of the medium may be necessary. After these test results have been obtained, sterile solutions containing concentrated nutrients such as sugars, amino acids or vitamins, necessary to obtain maximum growth may be added. Sterile bases or acids may be added to readjust the medium to the optimum pH required for the growth of the specific bacteria being produced.

The fermentor is, preferably, of stainless steel construction and steam jacketed of sufficient strength to allow the use of 30 lbs. (134° C.) steam pressure. By using 30 lbs. steam pressure in the jacket and running the helical agitator it is possible to sterilize the culture medium in 15 minutes. Cold water can now be forced through the jacket, cooling the medium to 37° C., the optimum temperature for growing bacteria. The method of rapid sterilization and cooling preserves certain thermolabile growth promoting substances in the medium which would be destroyed by the 1 to 2 hours at 15 lbs. steam pressure which has customarily been used to sterilize large volumes of culture media.

In operation, culture medium comprising deionized water and nutrients required for bacterial growth are added to the fermentor under aseptic conditions through a sterile valve. The helical agitator and the steam valve supplying steam to the steam jacket are turned on. The temperature of the culture medium rises rapidly to 134° C. and is maintained for approximately 15 minutes in order to sterilize the medium. After sterilization of the medium is complete, the temperature of the medium is rapidly lowered to 37° C. At this time the medium is seeded with a culture of the specific bacterium which is early in the logarithmic phase of growth. (A 20 ml. sample of the seeded culture medium is taken from the special sampling device by means of a sterile hypodermic syringe and needle. Control or 0 time measurements of pH, optical density, etc. are conducted on this sample.) Measured amounts of sterile air or other gases, such as nitrogen or carbon dioxide, are continuously added to the seeded culture medium. The helical agitator offers a very efficient method of aeration of the seeded culture medium. Optimum amounts of sterile air can be provided by altering the rate of air flow or the speed of the helical agitator. The air is sterilized by passing it through an electric incinerator. Starting with an actively growing seed culture and by giving proper attention to nutrients, pH, and aeration, the lag phase of bacterial growth is reduced to a minimum and the bacterial culture very quickly proceeds to the logarithmic phase of growth. Samples are taken at regular intervals for optical density measurements in a photonephelometer.

In the preparation of veterinary bacterins, bacterial counts have been estimated by comparing the optical density of the bacterial suspension with that of a MacFarland barium sulfate standard. The Animal Inspection and Quarantine Division of the Agricultural Research Service of the United States Department of Agriculture, which is in charge of licensing veterinary bacterins, has accepted that an optical density of three times the MacFarland No. 1 barium sulfate standard corresponds to approximately one billion bacterial per milliliter of suspension. Formerly optical densities of MacFarland Standards and bacterial suspensions were compared visually. In my process this comparison is made in a photonephelometer; for example, a Klett-Summerson colorimeter, which is more accurate than by the visual method. Since optical density is directly related to the bacterial count, the rate of bacterial growth in the medium in the fermentor can be determined by optical density measurements.

Samples of the bacterial culture are taken at regular time intervals, and the bacterial growth curve determined by plotting the optical density against time. From information obtained from the growth curve, the proper time to harvest the culture, while still in its logarithmic phase of growth, can be determined. It is often possible to extend the period of logarithmic growth in order to obtain the maximum yield of actively metabolizing bacterial cells by making adjustments in the pH or by the addition of nutrients.

When the bacterial culture has reached the end of the logarithmic phase of growth and is ready for harvest, the culture may be withdrawn from the fermentor or chemicals such as formalin may be added to inactivate the bacterial culture. After a suitable time for chemical inactivation of the culture, which is now referred to as crude bacterin, the inactivated bacterial culture is withdrawn from the fermentor and is ready for the refinement and concentration steps.

An alternate procedure is as follows. When the bacterial culture is in the logarithmic phase of growth, the culture can be maintained in a steady state by the continuous addition of fresh sterile medium and by the continuous withdrawal of an equivalent amount of bacterial culture. This is accomplished by fitting the fermentor with a finger action reciprocating finger pump which pumps in sterile culture media at a constant rate and removes bacterial culture at the same rate.

The crude bacteria is centrifuged at high speed in a continuous flow centrifuge such as Sharples centrifuge. The chemically inactivated bacterial cells are deposited onto the wall of the centrifuge cylinder. The culture medium and extraneous growth products are discharged in the centrifuge effluent and discarded. While the centrifuge cylinder is still spinning at high speed, sterile buffered saline may be added to wash away any residual traces of bacterial culture medium. The centrifuge is stopped, fresh sterile saline and sterile glass bead added to the centrifuge cylinder and the openings in centrifuge cylinder closed with sterile rubber stoppers. The closed cylinder is gently rotated in a horizontal position to resuspend the chemically inactivated bacterial cells in saline. The saline suspension is then filtered into a sterile container through gauze to remove the glass beads. The optical density of a sample of this saline suspension of chemically inactivated bacterial cells is determined photonephelometrically. From this information adjustments of the volume may be made by the addition of sterile buffered saline and preservatives in order to have a suspension containing a standardized number of chemically inactivated concentrated bacterial cells. This is referred to as a standardized washed bacterin stock suspension.

The standardized washed bacterial stock suspensions are mixed using aseptic precautions according to the following formulas and diluted to contain from 2 to 11 billion organisms per ml., and then tested for sterility and safety for animal use. Typical products are as follows:

Avisepticus-Gallinarum bacterin (fowl cholera—fowl typhoid):

| | Percent |
|---|---|
| *Pasteurella avicida* | 50 |
| *Salmonella gallinarum* | 50 |

Action and uses: An aid in prevention of fowl cholera and fowl typhoid.

Corynebacterium-Pasteurella bacterin:

| | Percent |
|---|---|
| *Pasteurella boviseptica* (buffalo strain) | 50 |
| Corynebacteria (from bovine, porcine and bovine sources) | 50 |

Action and uses: An aid in the control of hemorrhagic septicemia of cattle, swine and sheep, especially when complicated by diphtheroid infection.

Coli-Staphylococcus-Streptococcus bacterin:

| | Percent |
|---|---|
| *Staphylococcus aureus* | 40 |
| *Streptococcus agalactiae* | 40 |
| *Escherichia coli* | 20 |

All of bovine origin.

Action and uses: An aid in control of mastitis or other infections when caused by organisms such as listed in the formula.

Hemorrhagic Septicemia bacterin: Chemically killed saline suspensions of Pasteurella organisms obtained from buffalo, horses, cattle, sheep and swine—20% of each strain.

Action and uses: For use on all of the above-mentioned species of animals as an aid in prevention of pasteurellosis.

Mixed bacterin, bovine—Formula 1:

| | Percent |
|---|---|
| Pasteurella aviseptica | 25 |
| Staphylococcus albus and aureus, each 12.5% | 25 |
| Streptococcus (nonhemolytic) | 25 |
| Pseudomonas aeruginosa | 25 |

Action and uses: An aid in prevention of conditions in chickens attributed to organisms named in the formula.

Mixed bacterin, bovine—Formula 1:

| | Percent |
|---|---|
| Pasteurella boviseptica | 50 |
| Corynebacterium bovis and pyogenes, each 15% | 30 |
| Streptococcus (pyogenic) | 10 |
| Staphylococcus albus and aureus, each 5% | 10 |

All of bovine origin.

Action and uses: An aid in prevention of keratitis, pneumonia and other conditions attributed to organisms named in the formula.

Mixed bacterin, bovine—Formula 2:

| | Percent |
|---|---|
| Streptococcus (pyogenic) | 50 |
| Corynebacterium pyogenes | 30 |
| Staphylococcus aureus | 10 |
| Escherichia coli | 10 |

All of bovine origin.

Action and uses: As an aid in treatment of mastitis and other conditions due to infection with organisms listed in the formula.

Mixed bacterin, bovine—Formula 3:

| | Percent |
|---|---|
| Escherichia coli | 30 |
| Salmonella enteritidis (Gaertner) | 30 |
| Aerobacter aerogenes | 20 |
| Pasteurella boviseptica | 20 |

All from calves affected with calf scours.

Action and uses: An aid in the control of scours in calves when attributed to organisms named in the formula.

Mixed bacterin, equine—Formula 1:

| | Percent |
|---|---|
| Streptococcus (pyogenic) | 30 |
| Pasteurella equiseptica | 30 |
| Staphylococcus albus and aureus (each 10%) | 20 |
| Escherichia coli | 20 |

All of equine origin.

Action and uses: An aid in establishing resistance in horses to infections attributed to organisms named in the formula.

Mixed bacterin, ovine—Formula 1:

| | Percent |
|---|---|
| Corynebacterium ovis | 30 |
| Pasteurella oviseptica | 30 |
| Salmonella schottmülleri | 20 |
| Staphylococcus albus and aureus, each 10% | 20 |

Action and uses: An aid in establishing resistance in sheep to infection with one or more of the organisms named in the formula.

Mixed bacterin, porcine—Formula 1:

| | Percent |
|---|---|
| Pasteurella suiseptica | 30 |
| Salmonella choleraesuis | 30 |
| Streptococcus (pyogenic) | 20 |
| Corynebacterium pseudodiphthericum | 20 |

All of porcine origin.

Action and uses: An aid in establishing resistance in swine to infections with organisms named in the formula.

Mixed bacterin, porcine—Formula 2:

| | Percent |
|---|---|
| Salmonella choleraesuis | 30 |
| Salmonella schottmülleri | 30 |
| Pasteurella suiseptica | 20 |
| Escherichia coli | 10 |
| Streptococcus (pyogenic) | 10 |

All of porcine origin.

Action and uses: An aid in the control of swine enteritis when attributed to organisms named in the formula.

Pasteurella-Salmonella cholerasuis bacterin: Prepared from chemically killed saline suspensions of Pasteurella suiseptica and Samonella choleraesuis, each 50%.

Action and uses: The bacterin may be used as an aid in control of pneumonia-enteritis complex in swine when due to infection with Pasteurella and Salmonella choleraesuis organisms.

Mixed bacterin, feline—Formula 1:

| | Percent |
|---|---|
| Pasteurella felisepticus | 60 |
| Streptococcus (pyogenic) | 10 |
| Salmonella schottmülleri | 20 |
| Staphylococcus albus and aureus, each 5% | 10 |

All of feline origin.

Action and uses: As an aid in the development of resistance in healthy cats to infection by the organisms listed in the formula.

The following examples are given to more particularly illustrate the specific details of the present invention. Equivalent procedures and quantities will occur to those skilled in the art. The following examples are not meant to define the limits of the present invention, these being defined by the scope of the appended claims.

EXAMPLE 1

Forty-five liters of culture medium were prepared by adding the dry ingredients in deionized water and heating in a steam jacketed stainless steel kettle to dissolve the ingredients, comprising a medium of the following final concentrations:

| | Percent |
|---|---|
| Bacto peptone | 2 |
| Hycase—casein hydrolysate | 0.5 |
| N-Z Amine Type A—casein hydrolysate | 0.25 |
| N-Z Amine Type B—casein hydrolysate | 0.25 |
| Yeast extract | 0.5 |
| NaCl | 0.31 |

Deionized water, qs. to 45,000 ml.

The culture medium was transferred to the fermentor by means of a siphon and negative pressure. The medium was sterilized in the fermentor by the application of steam pressure sufficient to produce a temperature of 134° C. for 15 minutes. The helical agitator was operated during this period to insure thorough mixing of the medium. After the 15 minutes sterilization period, cold water was run through the jacket of the fermentor to rapidly cool the medium to 37° C.

When the medium had cooled to 37° C., it was seeded with 5,500 ml. of an actively growing culture of Salmonella choleraesuis. This cuture had been maintained on an agar slant. The growth from the agar slant had been transferred to a 1,500 ml. of culture medium in a 2 liter Erlenmeyer flask and aerated at 37° C. for 8 hours by rotation of the flask on a Brunswick rotary shaker. At the end of this time the 1,500 ml. of culture was added to 4,000 ml. of fresh medium in a sterile 5 gallon bottle, aerated and incubated for an additional 16 hours at 37° C. on a rotary shaker giving a total volume of 5,500 ml. of seed culture.

Immediately after seeding the medium in the fermentor a 20 ml. sample of the seeded medium was taken from the special sampling device by means of a sterile hypodermic syringe and needle. The control 0 time pH was 7.5 and the optical density as determined by a Klett reading was 39.

The helical agitator was operated at 120 r.p.m. and sterile air was supplied at the rate of 3 c.f.m.

Figure 2:
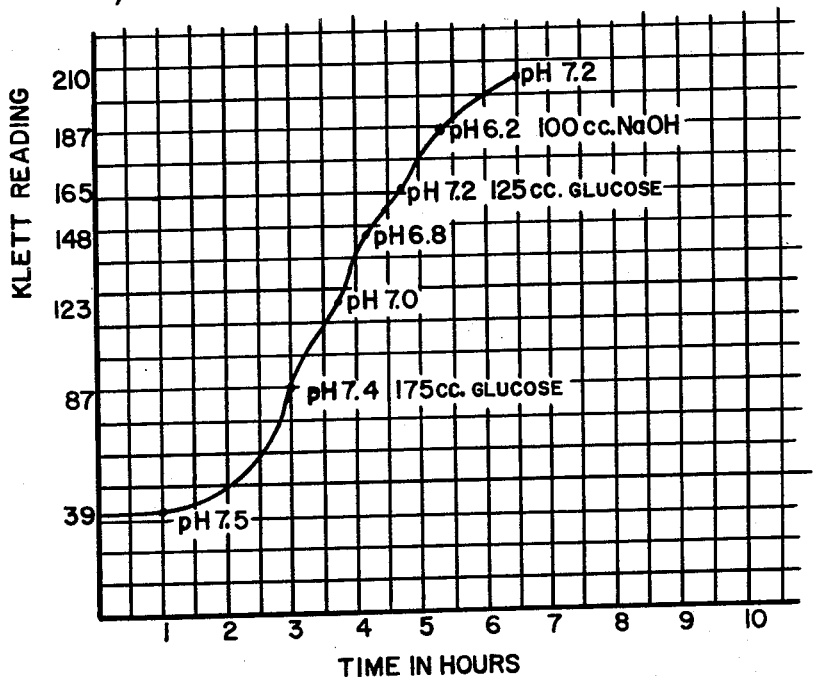
Figure 3:
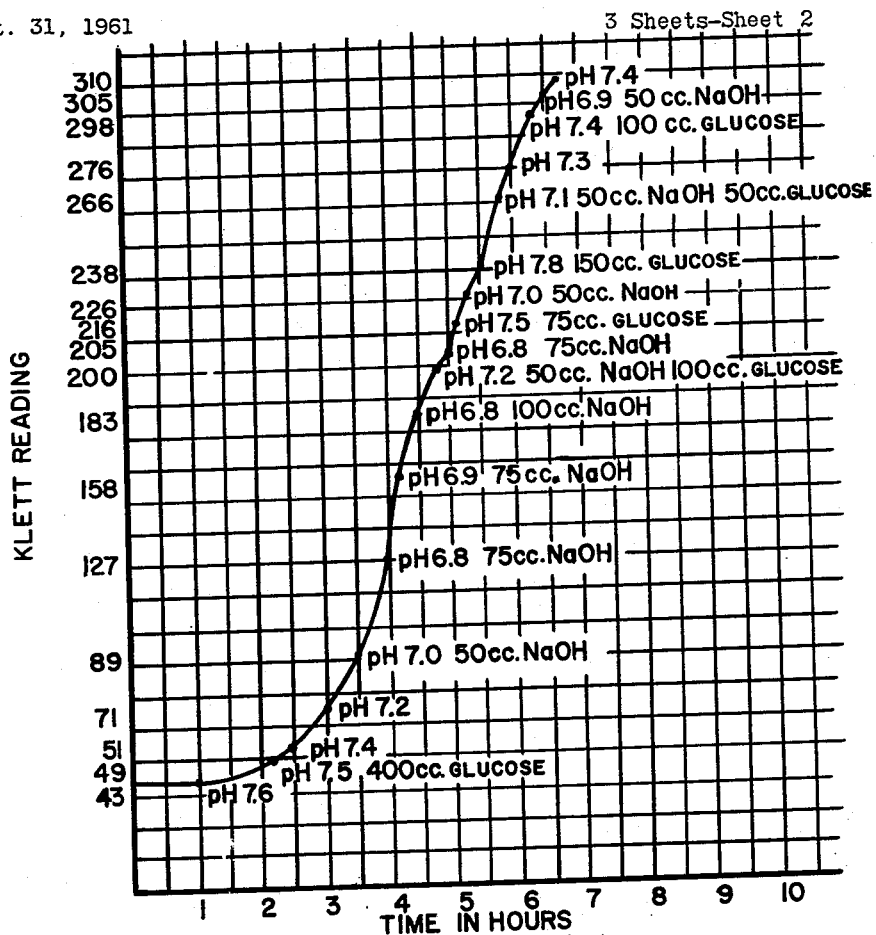
Figure 4:
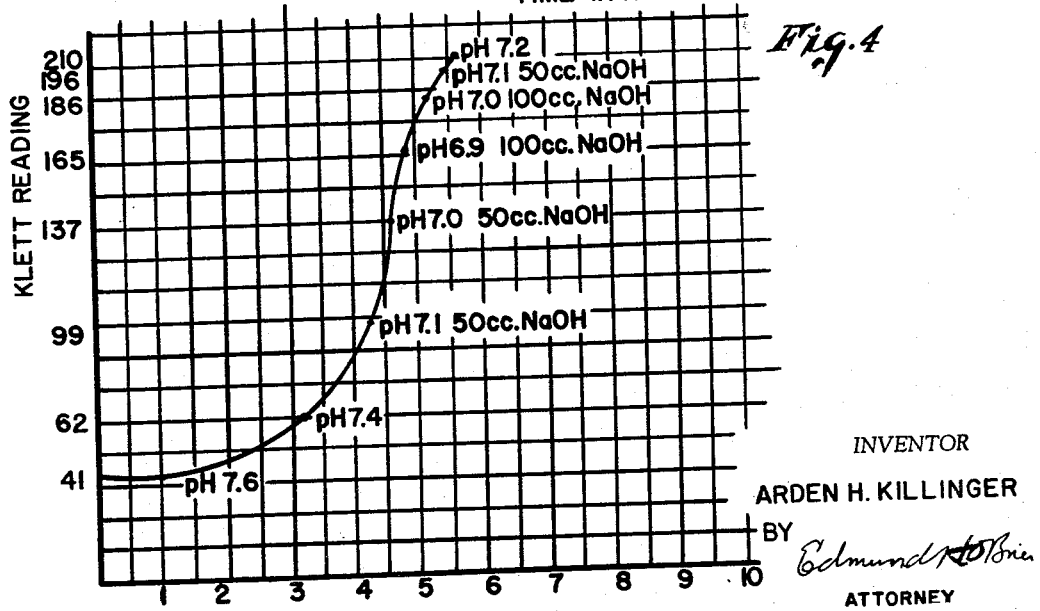
Figure 5:
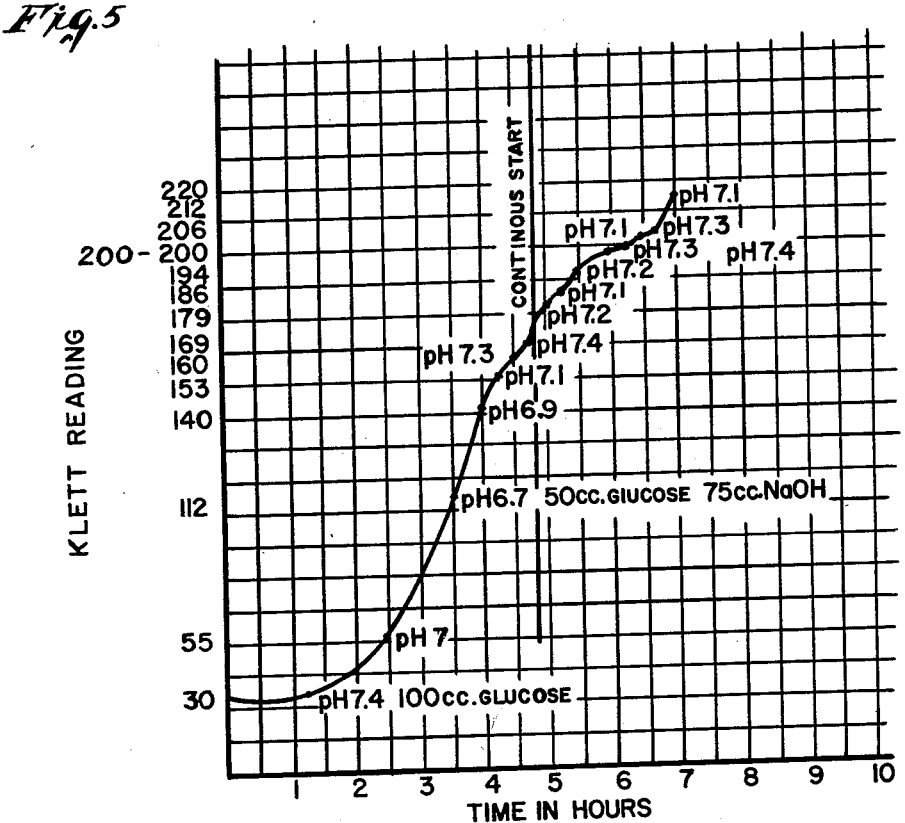

After 2 hours the pH was 7.4 and the Klett reading 87. At this time 175 ml. of sterile 50% glucose solution was added. At 2 hours 45 minutes the pH was 7.0 and the Klett reading 123. At 3 hours 8 minutes the pH was 6.8 and the Klett reading 148. At 3 hours 40 minutes the pH was 7.2 and the Klett reading 165. At this time 125 ml. of sterile 50% glucose was added. At 4 hours 15 minutes the pH was 6.2 and the Klett reading 187. At this time 100 ml. of sterile 5 N NaOH was added. At 5 hours 25 minutes the pH was 7.2 and the Klett reading was 210. From this information the growth curve was drawn by plotting Klett readings on the ordinate and time on the abscissa as shown in FIGURE 2. The graph indicated that bacterial growth was still in the logarithmic phase. The run was terminated at this time and the bacterial culture harvested by withdrawal into sterile 5 gallon pyrex bottles. The bacterial culture was now chemically inactivated with formalin by adding sufficient reagent grade formalin to each bottle of bacterial culture to give a final concentration of 0.4% formalin. The bottles of formalinized bacterial culture are kept at room temperature until bacterial sterility tests show that the culture has been sterilized by the formalin. This constituted the crude bacterin.

The crude *Salmonella choleraesuis* bacterin was refined and concentrated by centrifugation at high speed in a Sharples centrifuge during which process the chemically inactivated bacterial cells were deposited onto the wall of the centrifuge cylinder. The centrifuge effluent was discarded. The bacterial cells were washed by passing sterile saline solution through the centrifuge. After the washing process fresh sterile saline and sterile glass beads were added to the centrifuge cylinder and the chemically inactivated bacterial cells were resuspended in saline by a gentle rotation in a horizontal position of the centrifuge cylinder containing glass beads. The optical density of the resuspended cells was determined in a Klett photonephelometer. On the basis of this Klett reading the amount of saline and preservative was calculated and subsequently added to give a standardized washed bacterin stock suspension containing 30 billion *Salmonella choleraesuis* per ml. The yield was 36,900 ml.

EXAMPLE 2

*Salmonella choleraesuis* was grown in 45 liters of aerated media in a stainless steel fermentor essentially as in Example 1 except that the bacterial growth was maintained in the logarithmic phase by the further additions of sterile 50% glucose as a nutrient and by further adjustments of the pH by further additions of sterile 5 N NaOH. By following this procedure after the optical density was 210 on the Klett as in Example 1 the bacterial growth was further increased as indicated by a Klett reading of 310 at the time of harvest. Plotting of the growth curve still indicated the culture to be in the logarithmic phase of growth. The final yield of standardized washed bacterin stock suspension was 38,400 ml. with a count of 30 billion per ml. The growth curve is shown in FIGURE 3.

EXAMPLE 3

*Pasteurella suiseptica* was grown in 45 liters of aerated media in a stainless steel fermentor essentially as in Example 1. The control zero time pH was 7.6 and the optical density as determined by a Klett reading was 41. The helical agitator was operated at 120 r.p.m. and sterile air supplied at the rate of 2.5 c.f.m. After 2 hours 15 minutes the pH was 7.4 and the Klett reading was 62. After 3 hours 8 minutes the pH was 7.1 and the Klett reading was 99. At this time 50 ml. of sterile 5 N NaOH was added. After 3 hours 35 minutes the pH was 7.0 and the Klett reading 137. At this time 50 ml. of sterile 5 N NaOH was added. After 3 hours 50 minutes the pH was 6.9 and the Klett reading was 165. At this time 100 ml. of 5 N NaOH was added. After 4 hours and 6 minutes the pH was 7.0 and the Klett reading 186. At this time another 100 ml. of 5 N NaOH was added. After 4 hours 20 minutes the pH was 7.1 and the Klett reading 196. At this time 50 ml. of 5 N NaOH was added. After 4 hours 30 minutes the pH was 7.2 and the Klett reading was 200.

Subsequent pH and Klett readings are shown on the growth curve in FIGURE 4. The amounts of sterile 5 N NaOH added to neutralize the excess acid produced by bacterial growth and thus to readjust the pH are shown on the growth curve. After 4 hours and 30 minutes the growth curve indicated the bacteria were nearing the end of the logarithmic phase of growth; therefore the bacterial culture was harvested and chemically inactivated with formalin. After refinement and concentration by Sharples centrifugation and resuspension, a standardized washed bacterin stock suspension containing 30 billion *Pasteurella suiseptica* per ml. was obtained. The yield was 12,793 ml.

EXAMPLE 4

The alternate procedure of maintaining the bacterial culture in a steady state in the logarithmic phase of growth by the continuous addition of fresh sterile medium and by the continuous withdrawal of an equivalent amount of bacterial culture is illustrated with *Staphylococcus aureus*. Twenty liters of sterile culture media similar to that of Example 1 was seeded with an actively growing culture of *Staphylococcus aureus* in a stainless steel fermentor. Ten minutes after the start the pH was 7.4 and the Klett reading 30. 100 ml. of 50% glucose was added at this time. The helical agitator was operated at 120 r.p.m. and sterile air supplied at the rate of 1.5 c.f.m. After one hour the air was increased to 2.0 c.f.m. Subsequent pH, Klett readings, additions of sterile 5 N NaOH and sterile 50% glucose are shown on the growth curve in FIGURE 5.

After 3 hours and 45 minutes the growth curve began to give indications of leveling off. At this time a reservoir tank containing 10 liters of fresh sterile medium, to which 50 ml. of 50% glucose had been added, was connected to the inlet of the fermentor with sterile rubber tubing. A sterile rubber outlet tube was also attached to the fermentor. Both the inlet and outlet rubber tubings were placed in a finger action reciprocating pump in such a manner as to feed sterile fresh medium through the inlet tube at the same rate bacterial culture was being removed from the fermentor through the outlet tube. The pump was operated for 1 hour and 10 minutes. During this time 10 liters of fresh sterile culture medium were added to the fermentor and 10 liters of bacterial culture were withdrawn from the fermentor. At this time the pump was connected to another reservoir of 10 liters of sterile medium, to which 100 ml. of 50% glucose had been added, and the continuous addition of sterile fresh medium and the withdrawal of bacterial culture continued for another hour and 30 minutes. It appeared from the growth curve which is shown in FIGURE 5 that the organism could have been maintained much longer in the steady state of logarithmic growth by further additions of medium and withdrawal of culture. After the termination of the run the bacterial culture was chemically inactivated with formalin, centrifuged in a Sharples centrifuge, resuspended and standardized for bacterial count. The yield was 14,333 ml. with a count of 30 billion per ml.

EXAMPLE 5

Individual species of organisms representing various genera of bacteria associated with diseases of animals have been grown in aerated culture medium in a stainless steel fermentor, harvested during the logarithmic phase of growth, chemically inactivated, centrifuged, washed and resuspended as standardized washed bacterin stock suspensions. Examples are given in Table I. Although specific species of bacteria are given in the examples in Table I the process may be applied with equal success to other bacterial species within the genera Aerobacter, Corynebacterium, Escherichia, Pasteurella, Salmonella, Staphylococcus and Streptococcus. This may subsequently be indicated by the use of the abbreviation spp., after a bacterial genus, which indicates a plurality of individual species.

These data are tabulated to illustrate the comparative yields of washed bacterin suspension per ml. of media between the old method of growing organisms on solid media and the new process of this invention. The data on the new process are for purposes of illustration and do not represent the maximum yields which may be obtained by one skilled in the art. The comparative efficiencies of the old method and the new process are indicated in the right hand column of the table. A study of the growth curve of *Aerobacter aerogenes* indicated that it was harvested in the logarithmic phase of growth but before maximum growth had occurred.

Table I
INCREASED EFFICIENCY OF THE NEW INVENTION PROCESS COMPARED TO THE OLD WASHED BACTERIN METHOD

[Data expressed in billions of organisms per milliliter of culture medium]

| Organism | Old Method | Invention Process | Efficiency of Invention Process Over Old Method |
|---|---|---|---|
| Aerobacter aerogenes | 19.8 | 18.5 | 0.9X |
| Corynebacterium spp | 10.1 | 16.7 | 1.7X |
| Escherichia coli | 16.4 | 26.9 | 1.6X |
| Pasteurella boviseptica | 4.1 | 11.8 | 2.9X |
| Pasteurella equiseptica | 4.0 | 10.7 | 2.7X |
| Pasteurella multocida | 3.1 | 14.7 | 4.7X |
| Pasteurella suiseptica | 5.2 | 15.8 | 3X |
| Salmonella choleraesuis | 10.3 | 25.1 | 2.5X |
| Staphylococcus aureus | 16.6 | 34.3 | 2.1X |
| Streptococcus pyogenes | 1.0 | 4.7 | 4.7X |

EXAMPLE 6

The use of standardized, chemically inactivated, washed bacterin stock suspensions prepared according to the present invention in the preparation of a typical mixed bacterin for use in animals is illustrated. Each standardized washed bacterin stock suspension, containing 30 billion organisms per ml., is diluted and mixed as follows:

|  | Ml. |
|---|---|
| *Pasteurella suiseptica*, 30 billion/ml | 15,000 |
| *Salmonella choleraesuis*, 30 billion/ml | 15,000 |
| *Streptococcus pyogenes*, 30 billion/ml | 10,000 |
| *Corynebacterium* spp., 30 billion/ml | 10,000 |
| Sterile 0.85% NaCl | 150,000 |
| Formalin, q.s. to 0.2% volume of bacterin. | |
|  | 200,000 |

Each ml. of bacterin contains 7.5 billion organisms according to the following formula:

|  | Percent |
|---|---|
| *Pasteurella suiseptica* | 30 |
| *Salmonella choleraesuis* | 30 |
| *Strepticoccus pyogenes* | 20 |
| *Corynebacterium* spp | 20 |

The completed bacterin is dispensed under aseptic conditions into 100 ml. bottles which are closed with rubber stoppers.

It is recommended as an aid in establishing resistance in swine to bacterial infections associated with organisms in the formula and is used to aid in the prevention of such bacterial infections of swine as pneumonia, enteritis, endometritis and navel ill.

I claim:
1. The method of preparing a refined and concentrated bacterin suspension which comprises the steps of inoculating with a viable strain of aerobic bacterium a sterile bacterial culture medium containing nutrients needed for bacterial growth; maintaining growth conditions favorable to growth of aerobic bacteria, thereby greatly increasing the number of living bacterial cells in said culture medium, and maintaining the said bacteria in that part of their growth cycle wherein growth is in the logarithmic phase; harvesting said bacterial cells as a washed bacterin while substantially all of said bacterial growth cycle is in the logarithmic growth phase by chemically inactivating said bacterial cells by treatment thereof with a chemical agent which will inactivate said living bacteria, refining the inactivated cells by centrifuging the harvested bacteria, removing the supernatant, washing the centrifuged bacteria, and suspending the bacteria in injectable fluids, thereby securing said concentrated bacterin suspension.

2. The method of preparing a refined and concentrated bacterin suspension which comprises the steps of inoculating with a viable strain of an aerobic bacterium a sterile bacterial culture medium containing nutrients needed for bacterial growth; maintaining growth conditions favorable to bacterial growth, thereby greatly increasing the number of living bacterial cells in said culture medium; removing a volume, constituting a part of said culture medium, said removed volume containing growing bacteria suspended therein, at a time when bacterial growth in said culture medium is in the logarithmic phase of the growth cycle, and substantially simultaneously replacing said removed volume by a substantially equal volume of sterile bacterial culture medium, thus replacing nutrients and prolonging that part of the bacterial growth cycle wherein bacterial growth is in the logarithmic growth phase; and harvesting said bacterial cells as a refined and concentrated bacterin while substantially all of said bacterial growth cycle is in the logarithmic growth phase, at which phase said bacterial cells have the highest antigenic values and are most productive of effective bacterins, by chemically inactivating said bacterial cells by treatment thereof with a chemical agent which will inactivate said living bacteria, refining the inactivated bacterial cells by centrifuging the harvested bacteria, removing the supernatant, washing the centrifuged bacteria, and suspending the bacteria in injectable fluids thereby securing said refined and concentrated bacterin suspension.

3. A method according to claim 1 in which the culture medium is inoculated with a viable strain of *Salmonella choleraesuis*.

4. A method according to claim 2 in which the culture medium is inoculated with a viable strain of *Salmonella choleraesuis*.

5. A method according to claim 1 in which the culture medium is inoculated with a viable strain of a Pasteurella species of bacterium.

6. A method according to claim 2 in which the culture medium is inoculated with a viable strain of a Pasteurella species of bacterium.

7. A method according to claim 2 in which the culture medium is inoculated with a viable strain of an Aerobacter species of bacterium.

8. A method according to claim 2 in which the culture medium is inoculated with a viable strain of a Corynebacterium species of bacterium.

9. A method according to claim 2 in which the culture medium is inoculated with a viable strain of an Escherichia species of bacterium.

10. A method according to claim 2 in which the culture medium is inoculated with a viable strain of a Salmonella species of bacterium.

11. A method according to claim 2 in which the culture medium is inoculated with a viable strain of Staphylococcus species of bacterium.

12. A method according to claim 1 in which the culture medium is inoculated with a viable strain of a Streptococcus species of bacterium.

13. The method of preparing a refined and concentrated bacterin suspension which comprises the steps of inoculating with a viable strain of an aerobic bacterium a sterile bacterial culture medium containing nutrients needed for bacterial growth, maintaining growth conditions favorable to bacterial growth, including aeration, pH maintenance, and adequate nutrients, thereby greatly increasing the number of living bacterial cells in said culture medium at a time when bacterial growth in said culture medium is in the logarithmic phase, removing a volume, constituting a part of said culture medium, said removed volume containing growing bacteria suspended therein, and substantially simultaneously replacing said removed volume by a substantially equal volume of sterile bacterial culture medium, thus replacing nutrients and prolonging that portion of the bacterial growth cycle wherein bacterial growth is in the logarithmic growth phase; and harvesting said bacterial cells as a bacterin while substantially all of said bacterial cells are most antigenic and said growth is still in the logarithmic phase of growth by chemically inactivating said bacterial cells by treatment thereof with a chemical agent which will inactivate said living bacteria, separating the inactivated cells by centrifuging the harvested cells, removing the supernatant, washing the centrifuged cells, and suspending said washed cells in an injectable aqueous medium substantially free of bacterial nutrients and toxins.

14. A method according to claim 13 in which the culture medium is inoculated with a viable strain of *Salmonella choleraesuis*.

15. A method according to claim 13 in which the culture medium is inoculated with a viable strain of a Salmonella species of bacteria.

16. A method according to claim 13 in which the culture medium is inoculated with a viable strain of a Pasteurella species of bacterium.

17. The method of preparing a refined and concentrated bacterin suspension which comprises the steps of inoculating with a viable strain of a bacterium selected from the group consisting of species within the Aerobacter, Corynebacterium, Escherichia, Pasteurella, Salmonella, Staphylococcus, and Streptococcus genera, a sterile bacterial culture medium containing nutrients needed for bacterial growth and maintained free from contamination by other organisms, maintaining conditions favorable to bacterial growth, including agitation, aeration, replacement of exhausted nutrients, and maintenance of favorable conditions of temperature and pH, thereby producing a vigorously growing culture of said bacterium and, when bacterial growth in the said bacterial culture is in the logarithmic phase of the growth cycle as determined by successive measurements of optical density, continuously adding fresh sterile bacterial culture medium and continuously withdrawing at substantially the same rate the said growing culture of said bacterium and harvesting the bacterial cells in said continuously withdrawn bacterial culture by treatment with formaldehyde at a concentration of about 0.4% for a time sufficient to inactivate said cells, separating the inactivated cells by centrifugation, washing the separated cells to remove culture medium containing toxins and formaldehyde, and resuspending the washed cells in an injectable medium, thereby obtaining a refined and concentrated bacterin.

References Cited in the file of this patent

UNITED STATES PATENTS

| | | |
|---|---|---|
| 1,511,557 | Franklin | Oct. 14, 1924 |
| 2,017,606 | Reichel | Oct. 15, 1935 |
| 2,719,102 | Baldwin | Sept. 27, 1955 |

OTHER REFERENCES

Winslow et al.: Bact. Revs., pages 170–186, vol. 3, 1939.

MacFarlane et al.: The Biochemical J., vol. 35, part 2, 884, 889 and 901–902 (1941).

MacFarlane et al.: The Biochemical J., vol. 35, 1941, p. 888.

Gerhardt: J. Bact., 1946, pages 283–292.

Gershenfeld: Bacteriology and Allied Subjects, pp. 477–480, pub. 1945 by Mack Publishing Co., Easton, Pa.

Dubos: The Bacterial Cell, pages 137–143, pub. by Harvard Univ. Press, Cambridge, Mass., 1955.

UNITED STATES PATENT OFFICE
CERTIFICATE OF CORRECTION

Patent No. 3,139,382                                                        June 30, 1964

Arden H. Killinger

It is hereby certified that error appears in the above numbered patent requiring correction and that the said Letters Patent should read as corrected below.

Column 2, line 65, for "activtities" read -- activities --; column 5, line 10, for "Mixed bacterin, bovine-Formula 1:" read -- Mixed bacterin, avian (chicken formula): --; column 6, line 64, for "cuture" read -- culture --; column 7, line 19, for "The" read -- This --.

Signed and sealed this 9th day of February 1965.

(SEAL)
Attest:

ERNEST W. SWIDER                                             EDWARD J. BRENNER
Attesting Officer                                                        Commissioner of Patents